Jan. 22, 1924.  
H. D. STEINMARK  
STEERING WHEEL LOCK  
Filed Feb. 27, 1923
1,481,276
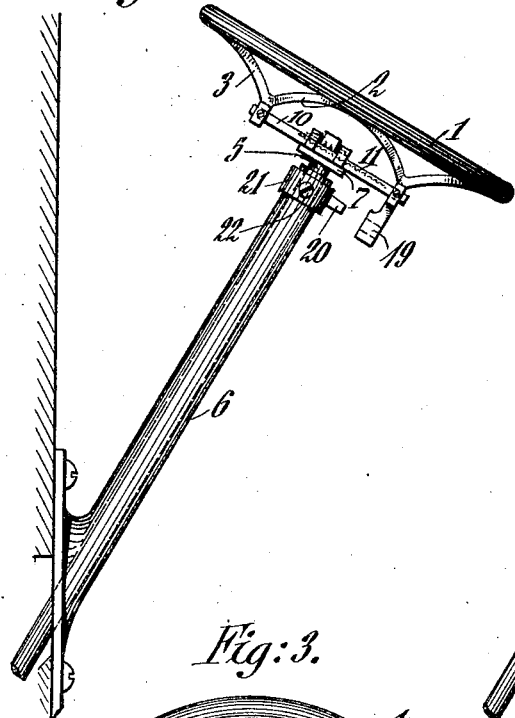
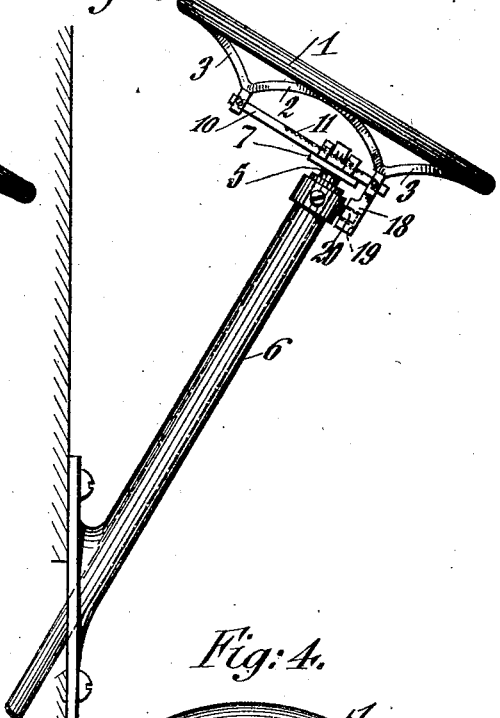
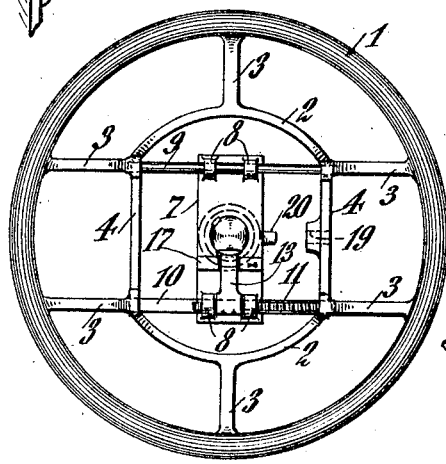
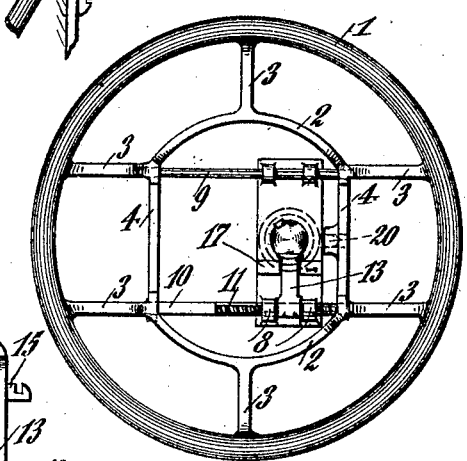
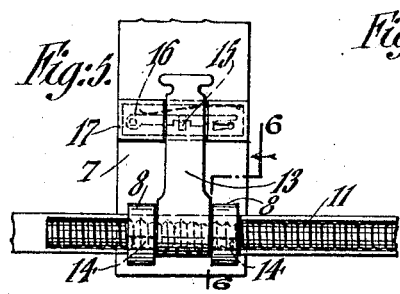
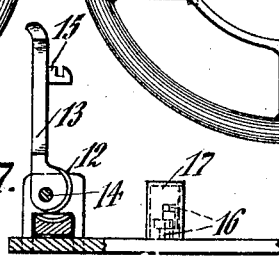
INVENTOR  
Harry D. Steinmark  
BY  
C. P. Loepel  
ATTORNEY Patented Jan. 22, 1924.

1,481,276

UNITED STATES PATENT OFFICE.

HARRY D. STEINMARK, OF BAYRIDGE, BROOKLYN, NEW YORK.

STEERING-WHEEL LOCK.

Application filed February 27, 1923. Serial No. 621,686.

*To all whom it may concern:*

Be it known that I, HARRY D. STEINMARK, a citizen of the United States, and resident of Bayridge, in the borough of Brooklyn, county of Kings, and State of New York, have invented certain new and useful Improvements in Steering-Wheel Locks, of which the following is a specification.

This invention relates to means for protecting an automobile against theft, or unprivileged use thereof, and consists of means for locking the steering wheel in engagement with a fixed post, so as to prevent the machine from being operated.

The invention has for its main object to produce a device of the character stated, which shall be simple in construction, effective in operation, readily adjusted, and adapted to be quickly and effectively operated.

With the foregoing and other objects in view, hereinafter stated, the invention consists of the construction herein described and illustrated in the accompanying drawings, which show the invention in the preferred form; but it is to be understood that changes therein, and modifications thereof may be employed without departing from the general construction and mode of operation herein illustrated and described.

In the drawings, in which similar reference numerals indicate similar parts throughout the several views:

Fig. 1 is a side elevation of an automobile steering wheel and locking mechanism embodying the invention, the parts being shown in position when the machine is in use;

Fig. 2 is a side elevation of the parts shown in Fig. 1 arranged as when the device is in locked position;

Fig. 3 is a plan of the steering wheel and connecting parts arranged as shown in Fig. 1;

Fig. 4 is a plan of a steering wheel and connecting parts arranged as shown in Fig. 2;

Fig. 5 is a plan showing an enlargement of a section of Fig. 3;

Fig. 6 is a side elevation partly in section of the parts shown in Fig. 5 taken on dotted line 6—6 thereof, the parts being shown in locked position; and Fig. 7 is a side elevation partly in section of the parts shown in Fig. 6, the locking cam being shown in released position.

As illustrated in the drawings, the steering wheel is provided with an outer ring 1 and an inner skeleton frame comprising oppositely disposed arc bars 2 connected with the outer ring by means of tie rods 3. Oppositely disposed cross-bars 4 are also provided in the inner frame to form the structure of the frame of the wheel; the structure shown and described, however, is not an essential feature of the invention.

A steering rod 5 is mounted within a post 6 of ordinary construction, secured to the frame of the automobile, and the upper end of the steering rod is provided with a head or block 7 by means of which the steering wheel is adjustably connected with its supporting rod. The block 7 is provided with apertured lugs 8 serving as guide ways, and adapted to engage rods 9 and 10 secured to the hand-wheel and extending transversely of said block. One of said rods 9 may be plain in formation and serves as a sliding bar, adapting the hand-wheel to be moved relatively to the block or head 7 and to be held against torsional movement while being so moved.

The oppositely disposed bar 10 serves not only as a sliding bar for the same purpose as the cross-bar 9, but is also provided with teeth 11 extending across the surface of the bar 10, and preferably in inclined lines.

The purpose of the teeth 11 on the bar 10 is to engage corresponding teeth or threads 12 on a cam provided with a hand operated lever 13.

The aperture lugs 8 which engage the sliding tooth bar 10 are extended vertically so as to provide a bearing by means of which the tooth cam may be pivotally mounted thereon by means of a stud 14, as shown in Figs. 6 and 7. The purpose of such construction is to enable the hand-wheel to be moved transversely of the bearing block or head 7 when the handle 13 of the tooth cam is raised, as shown in Fig. 7, and to hold the hand-wheel fixed in position when the teeth 12 of the cam are brought into engagement with the teeth 11 of the bar 10, as shown in Fig. 6.

The outer or free end of the lever 13 of the cam is provided with a latch engaging member or other equivalent device 15 adapted to engage a latching member 16, shown in dotted lines in Figs. 5 and 6, said latch being mounted upon a keeper 17 secured to the block 7. The latch engaging member may be locked in engagement with the keeper by means of a key to prevent unauthorized disengagement of the toothed cam from the bar 10.

One of the cross-bars 4 is provided with means of any suitable construction for engaging the fixed post 6, such as the downwardly extending arm 18 provided with an aperture 19 adapted to engage a corresponding pin 20 connected with the post 6 in any suitable manner, as by means of a collar 21 attached to said post by means of a screw 22, or otherwise.

When the device is in use the parts are in the position indicated in Figs. 1 and 3, preferably with the latch engaging member 15 in locked engagement with the latch of the keeper 17, whereby the steering wheel may be operated as if its connecting parts were of ordinary construction.

Where it is desired, however, to leave the machine unattended, the cam lever 13 may be released from the keeper and raised, so that the hand-wheel may be pushed transversely of the block 7 toward the dash board of the machine, and bring the aperture 19 of the arm 18 in engagement with the pin 20 of the post 6. The cam lever 13 is then depressed so as to bring its latch engaging member in engagement with the latching member, which may then be locked in said position by means of a key that can be kept in the possession of the owner, and thereby prevent unauthorized use of the machine.

What I claim as new and desire to secure by Letters Patent is:

1. In a locking device for a steering wheel, the combination of a fixed post, a steering bar mounted therein and provided at its upper end with a head, a threaded cam mounted on said head, and a steering wheel provided with cross-bars slidingly mounted on said head, one of said bars being provided with teeth engaging the threads of said cam.

2. In a locking device for a steering wheel, the combination of a fixed post, a steering rod mounted therein, a head connected with the upper end of said rod and provided with guide ways, a steering wheel having cross-bars slidingly engaging the guide ways of said head, one of said cross-bars being provided with teeth, and a locking device securing said block and cross-bar together.

3. In a locking device for a steering wheel, the combination of a fixed post, a steering rod mounted in said post and provided on its upper end with a head having guide ways, a driving wheel having cross-bars slidingly engaging said guide ways, one of said cross-bars being provided with teeth inclined transversely of said cross-bar, a cam mounted on said head provided with threads engaging the teeth of said cross-bar, and a lock mounted on said head engaging said cam.

4. In a locking device for a steering wheel, the combination of a fixed post provided with a lateral projection, a steering rod mounted within said post and provided on its upper end with a head having guide ways and with an arm engaging the projection of said post, said wheel being also provided with cross-bars slidingly engaging said head, and cam locking means secured to said head and engaging one of said bars.

5. In a locking device for a steering wheel, the combination with a fixed post of a steering bar mounted therein provided on its upper end with a head having guide ways, and a steering wheel having cross-bars slidingly engaging said guide ways and having a downwardly extending arm engaging said post, and means for locking said steering wheel and post together.

In testimony that I claim the foregoing as my invention, I have signed my name hereunder.

HARRY D. STEINMARK.